Sept. 8, 1959
C. O. SCHMIDT, JR
2,902,711
EXCORIATOR
Filed Oct. 7, 1957
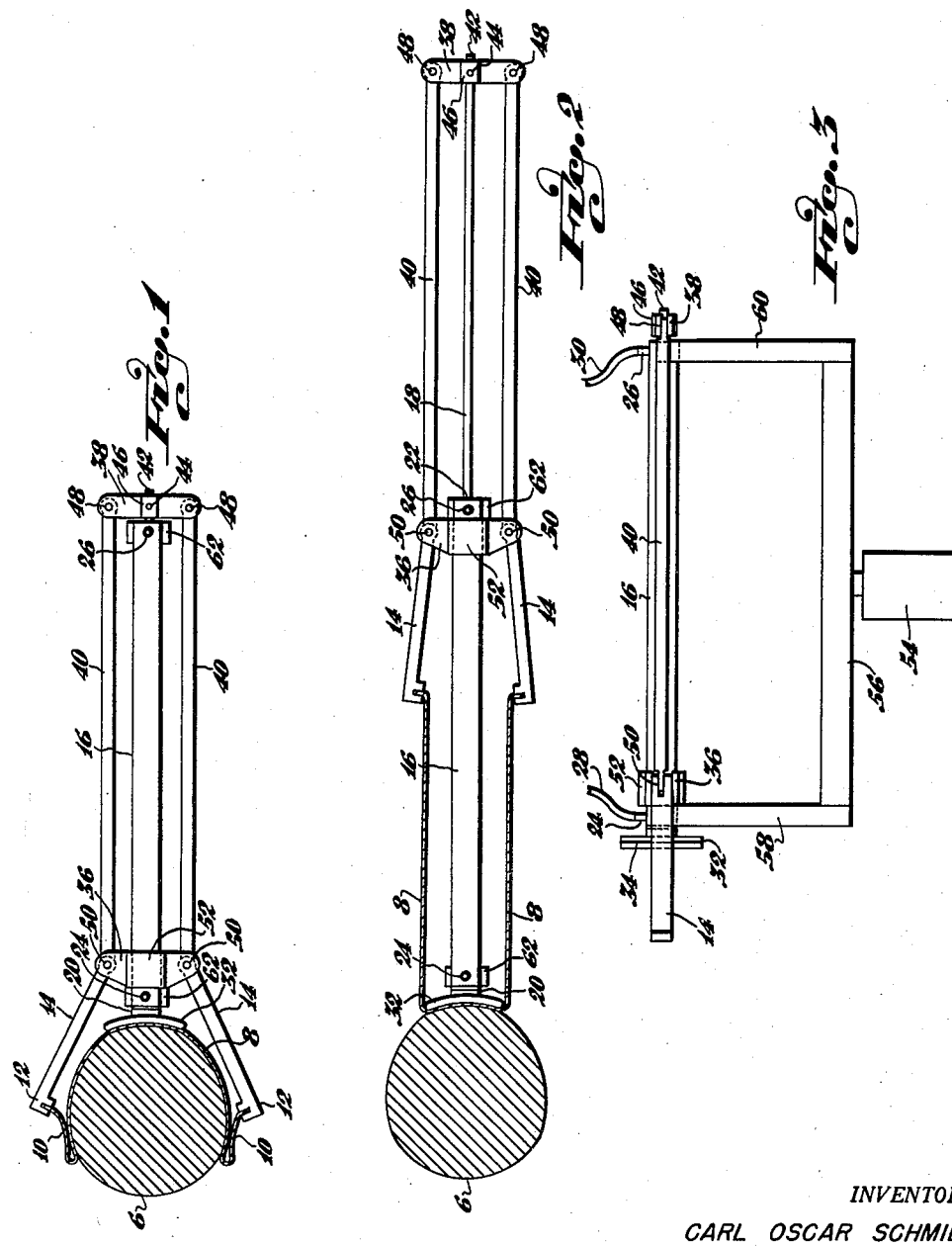
INVENTOR.
CARL OSCAR SCHMIDT, JR.
BY
*J Warren Kinney Jr.*
ATTORNEY

United States Patent Office 2,902,711
Patented Sept. 8, 1959

2,902,711

EXCORIATOR

Carl Oscar Schmidt, Jr., Wyoming, Ohio, assignor to The Cincinnati Butchers Supply Company, Cincinnati, Ohio, a corporation of Ohio Application October 7, 1957, Serial No. 688,683

10 Claims. (Cl. 17—21)

The present invention relates to an excoriator, and is concerned particularly with the stripping of hides from animal carcasses incident to the processing of meats. In meat processing or packing plants, it is customary to move animal carcasses from one processing station to another by means of overhead conveyors, from which the carcasses are suspended by means of chains and hooks. Usually the hooks engage the hind legs of the animals, suspending them with the head and neck lowermost.

At one stage of the operation, each suspended carcass is brought to an excoriating station, at which the hide is to be stripped off the carcass. In advance of stripping, the hide is slitted along the breast and belly of the animal, and along the leg bones, so that beginning at the belly slit the hide may be pulled toward the backbone for removal from the carcass. This stripping operation is performed preferably with the aid of mechanical equipment to facilitate and expedite the operation. Such equipment constitutes the subject matter of the present invention.

One object of the present invention is to provide an excoriator which is highly simplified and unusually low in cost, to the extent that it can be made available to custom butchers and small packing plants whose limited operations do not justify expenditure of funds for the very expensive equipment heretofore available for the mechanical stripping of hides.

Another object is to provide an excoriator of the type mentioned, which is light in weight and easily transported from one plant or location to another, without resort to the use of heavy and expensive rigging equipment, and the expensive labor cost which accompanies the use of such equipment.

The foregoing and other objects are attained by the means described herein and illustrated upon the accompanying drawing, in which:

Fig. 1 is a top plan view of the improved excoriator of the invention, shown in position preparatory to stripping the hide from a carcass, the latter being shown in transverse section.

Fig. 2 is a view similar to Fig. 1, showing the hide substantially stripped from the carcass.

Fig. 3 is a side elevational view of the excoriator, and illustrates a simple form of carrier whereby the excoriator may be supported in proper position for use.

In the drawing, 6 represents an animal carcass vertically hung from an overhead traveling conveyor, as previously explained. The hide 8, as shown in Fig. 1, has been prepared for stripping by slitting it up the breast and belly of the animal, to provide flaps 10—10. The flaps have marginal edges which preparatory to the stripping operation are secured in the jaws 12—12 of a pair of grippers or clamps 14—14, constituting parts of the excoriator. The gripper jaws are herein disclosed in conventional manner only, since these elements are well known in the art and may be variously constructed.

The apparatus includes an elongate hydraulic or pneumatic power cylinder 16 in which is reciprocable a piston rod or plunger 18, shown extended in Fig. 2. At its forward end, the cylinder is closed by a cap or head 20, whereas at the rearward end the cylinder is equipped with a packing head 22 of usual design, through which the piston rod may reciprocate without loss of fluid pressure about the piston rod. The heads at opposite ends of the cylinder may be provided with fluid pressure fittings 24 and 26, whereby fluid may be introduced to the cylinder and exhausted therefrom, for moving the piston rod or plunger in opposite directions within the cylinder, for power advancement and retraction of said rod or plunger. The cylinder heads and fluid pressure fittings may be conventional in character and design, and should therefore require no detailed disclosure or explanation. Pressure of fluid may be introduced to either end of the cylinder, and exhausted from the opposite end, through flexible lines indicated at 28 and 30, Fig. 3, to render the cylinder double-acting.

At the forward end of the cylinder is stationarily fixed a transverse plate or abutment element 32, the purpose of which is to position and support the backbone of the carcass as the hide is stripped therefrom. Element 32 preferably though not necessarily has a concavity 34 where it presses against the animal carcass, this serving to confer a degree of stability to the carcass as the hide is removed. Stripping of the hide is performed mechanically up to the plate or back rest 32, and that portion of the hide which remains attached to the carcass where covered by the plate or back rest, Fig. 2, is ordinarily stripped off manually with the use of a knife after the carcass is released from the excoriator.

The movable part of the apparatus, as distinguished from the stationary cylinder 16, comprises the piston rod or plunger 18, the grippers 14, and carriage means comprising a pair of cross heads or yokes 36 and 38 joined for unitary movement lengthwise of the cylinder by means of connecting rods 40. Yoke 38 is securely fixed to the outer or exposed end 42 of the plunger, in transverse relation thereto. Fixation may be accomplished in any suitable manner, as by means of a pin 44 or other fastener passing through the plunger and the bored central hub 46 of the yoke, which accommodates the plunger end 42. By means of transverse pins, bolts, or the like, indicated at 48, corresponding ends of the connecting rods 40—40 may be secured to opposite ends of yoke 38. In similar manner, the remaining ends of connecting rods 40 may be attached at 50 to opposite ends of the slide yoke 36.

Yoke 36 is provided with a central bored hub 52, which is slidable along substantially the full length of cylinder 16, from the retracted position of Fig. 1 to the extended position of Fig. 2. Such shifting of yoke 36 is assured by the fact that the exterior of cylinder 16 is smooth and of uniform diameter from end to end. In other words, the yoke has a bearing fit with the cylinder wall, for sliding movement thereon as the plunger or piston rod 18 is reciprocated within the cylinder. The grippers 14—14, being pivoted at the connections 50—50 upon the sliding yoke, are compelled to shift bodily with the yoke along the length of the cylinder.

From the foregoing, it will be understood that the hide flaps 10, held securely by the jaws of the grippers in the Fig. 1 position, will, upon extension of the plunger assembly to the Fig. 2 position, be pulled from the sides of the carcass to the extent illustrated by Fig. 2. Thereafter, the plunger assembly may be power-returned to the initial position of Fig. 1, at which the hide flaps may be easily released from the grippers. The carcass then may be conveyed from the vicinity of the excoriator, while another is brought into position for a subsequent stripping operation.

It may here be pointed out that the mechanism thus far described is very simple and sufficiently low in cost, as to be within the expense range of custom butchers and small packing plants whose limited operations do not justify the purchase of expensive equipment for hide stripping. The excoriator as disclosed can be inexpensively suspended by chains or cables from a beam or ceiling of the slaughter room, if desired. As an alternative, a stand or carrier for the apparatus may be inexpensively provided, as illustrated by Fig. 3, comprising a pedestal 54 upon which is mounted a beam 56 approximately in length the length of cylinder 16, and having at its opposite ends a pair of uprights or standards 58 and 60 to support opposite ends of the cylinder. In the simplest possible form, the uprights 58 and 60 may have forked or bifurcated upper ends as at 62, which provide seats in which the cylinder heads may rest. If desired, the opposite ends of cylinder 16 may be secured within the notches, or to the uprights, in any suitable manner, not shown.

As will be understood, the excoriator as a whole may conveniently be lifted off the stand or carrier described, and transported to another location without the use of expensive rigging. The cost of maintenance obviously is minimal, and any replacement parts, if needed, may be obtained at reasonable cost.

If desired, the pedestal 54 may be rotary in character, allowing the apparatus to be swung in a horizontal plane when necessary. Furthermore, the pedestal may be in the form of a hydraulic jack providing for changes in elevation of the excoriator. These and various other modifications and changes may be made, within the scope of the appended claims, without departing from the spirit of the invention.

What is claimed is:

1. Apparatus for stripping the hide from a suspended animal carcass, said apparatus comprising, in combination, a normally stationary fluid motor including an elongate cylinder and a piston rod reciprocable at one end of the cylinder, a back rest to support the carcass at the opposite end of the cylinder, a carriage slidably journalled upon the cylinder for shifting movement lengthwise thereof, hide gripping means on the carriage to strip the hide from the carcass, and means associated with the piston rod to reciprocate the carriage.

2. Apparatus for stripping the hide from a suspended animal carcass, said apparatus comprising, in combination, a fluid motor including a normally stationary elongate cylinder and a piston rod reciprocable at one end of the cylinder, a back rest at the opposite end of the cylinder to abut the carcass, the cylinder having an outer wall of uniform diameter from end to end thereof, a transversely bored yoke mounted upon the cylinder, with the bore of the yoke slidably embracing the cylinder for movement along the length of the cylinder, the yoke having opposite ends flanking the cylinder, a pair of hide grippers pivoted upon the yoke ends and extending in a common direction toward the back rest, a second yoke fixed transversely upon an end of the piston rod and having opposite ends coplanar with the ends of the yoke first mentioned, and a pair of connecting rods joining the yoke ends to enforce unitary movement of the yokes.

3. Apparatus for stripping the hide from a suspended animal carcass, said apparatus comprising, in combination, a fluid motor including a normally stationary elongate cylinder and a piston rod selectively reciprocable at one end of the cylinder, means at the opposite end of the cylinder to abut the carcass, the cylinder having an outer wall of uniform diameter from end to end thereof providing an external bearing surface, a transversely bored yoke mounted upon the cylinder bearing surface, with the bore of the yoke slidably embracing the cylinder for movement of the yoke along the length of the cylinder, the yoke having oppositely extending ends flanking the cylinder, a pair of hide grippers including arms pivoted upon the yoke ends and extending in a common direction toward the first mentioned means, a second yoke, and means fixing said second yoke transversely upon the extending end of the piston rod, said second yoke having opposite ends coplanar with and parallel to the ends of the yoke first mentioned, a pair of connecting rods each having a forward end and a rear end, means connecting the forward ends of the connecting rods to the slidable yoke ends, and means connecting the rear ends of the connecting rods to the ends of the second yoke, with the connecting rods in spaced parallelism with the piston rod.

4. Apparatus as specified in claim 3, wherein the combination includes a carrier supporting opposite ends of the cylinder at an elevation above floor level, in a substantially horizontal plane.

5. Apparatus for stripping the hide from an animal carcass, comprising, in combination, a fluid motor including a normally stationary elongate cylinder, a piston rod within the cylinder and having a free end projectable axially toward and from one end of the cylinder, means at the opposite end of the cylinder to abut the carcass, a carriage slidably embracing the exterior of the cylinder for shifting movement lengthwise thereof, hide gripping means on the carriage to strip the hide from the carcass, and connecting means between the carriage and the free end of the piston rod, for imparting axial movements of the piston rod to said carriage and the hide gripping means mounted thereon.

6. Apparatus as specified in claim 5, wherein the combination includes a carrier supporting opposite end portions of the cylinder at an elevation above floor level, in a substantially horizontal plane.

7. Apparatus for stripping the hide from an animal carcass, comprising in combination, a fluid motor including a normally stationary elongate cylinder, a piston rod within the cylinder and having a free end projectable axially toward and from one end of the cylinder, means at the opposite end of the cylinder to abut the carcass, the cylinder having an outer wall of uniform diameter from end to end thereof providing an external bearing surface, a transverse yoke slidably mounted upon the cylinder bearing surface for movement of the yoke along the length of the cylinder, the yoke having oppositely extending ends flanking the cylinder, a pair of hide grippers including arms pivoted upon the yoke ends and extending in a common direction toward the first mentioned means, a second yoke, and means fixing the second yoke transversely upon the free end of the piston rod, said second yoke having opposite ends aligned with the ends of the yoke first mentioned, a pair of connecting rods parallel to and substantially coextensive with the piston rod, and means connecting corresponding ends of the connecting rods to the ends of the first yoke and the second yoke, respectively.

8. Apparatus for stripping the hide from an animal carcass, comprising, in combination, a fluid motor including a normally stationary elongate cylinder, a piston rod within the cylinder and having a free end projectable axially toward and from one end of the cylinder, means at the opposite end of the cylinder to abut the carcass, a transverse yoke slidably mounted upon the cylinder for shifting movement along the length of the cylinder, the yoke having oppositely extending ends projected laterally of the cylinder axis, a pair of hide grippers including arms pivoted upon the yoke ends and extending in a common direction toward the first mentioned means, a second yoke, and means fixing the second yoke transversely upon the free end of the piston rod, said second yoke having opposite ends coplanar with the ends of the yoke first mentioned, a pair of connecting rods each having a forward end and a rear end, means connecting the forward ends of the connecting rods to the ends of the first yoke, and means connecting the rear ends of said rods to the ends of the second yoke, thereby compelling shifting of the yokes in unison.

9. Apparatus as specified in claim 8, wherein the combination includes a carrier supporting the cylinder at its opposite ends.

10. Apparatus as specified in claim 8, wherein the connecting rods are disposed in a horizontal plane in substantial parallelism with the piston rod and on opposite sides thereof.

References Cited in the file of this patent

UNITED STATES PATENTS

| | | |
|---|---|---|
| 2,461,466 | Coad | Feb. 8, 1949 |
| 2,605,998 | Beck | Aug. 5, 1952 |
| 2,696,633 | Hincks | Dec. 14, 1954 |